E. A. HAWTHORNE.
MOUNTING FOR GAS GENERATORS AND THE LIKE.
APPLICATION FILED MAY 7, 1913.
1,201,292.   Patented Oct. 17, 1916.
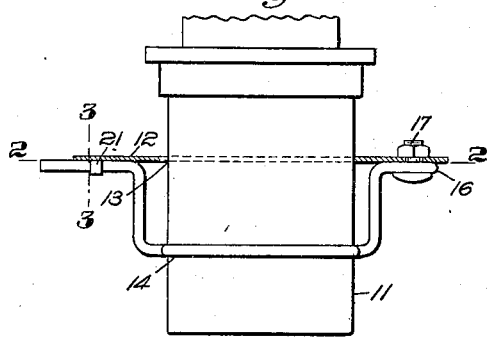
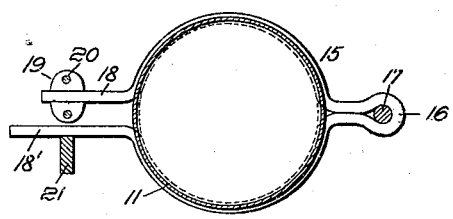
Witnesses:
Horace A. Crosman
Carl L. Choate.
Inventor:
Ellsworth A. Hawthorne

UNITED STATES PATENT OFFICE.

ELLSWORTH A. HAWTHORNE, OF BRIDGEPORT, CONNECTICUT.

MOUNTING FOR GAS-GENERATORS AND THE LIKE.

1,201,292.  Specification of Letters Patent.  Patented Oct. 17, 1916.

Application filed May 7, 1913. Serial No. 766,029.

*To all whom it may concern:*

Be it known that I, ELLSWORTH A. HAWTHORNE, a citizen of the United States, and a resident of Bridgeport, county of Fairfield, and State of Connecticut, have invented an Improvement in Mountings for Gas-Generators and the like, of which the following description, in connection with the accompanying drawings, is a specification, like characters on the drawings representing like parts.

This invention relates to mountings for gas generators, tanks and other similar bodies and will be best understood by reference to the following specification when taken in connection with the accompanying drawings of a specific embodiment thereof while its scope will be more particularly pointed out in the appended claim.

In the drawings: Figure 1 is an elevation partly in vertical section of one form of generator mounting embodying my invention; Fig. 2 is a plan section on line 2—2 of Fig. 1. Fig. 3 is a sectional view on line 3—3 of Fig. 1 looking toward the right.

Referring to the drawings and to the embodiment of my invention selected for illustrative purposes, 11 is a gas generator, tank or other similar body which it is desired to support in such a manner as to permit it to be readily dismounted and remounted.

The numeral 12 designates generally a support for the generator or other body, such support preferably consisting of a plate provided with an aperture 13 to receive the body to be supported. Herein the generator is provided with a circumferential groove 14 which will be referred to hereinafter.

The generator retaining device is in the form of a collar 15 encircling the generator and snugly fitting the circumferential groove 14. The collar may be and preferably is formed of round wire and the groove 14 is preferably correspondingly formed half round to receive the wire. Herein the wire is bent to form an eye 16 which receives an attaching member in the form of a bolt 17 passing through the supporting plate 12. The two terminal portions of the wire form arms 18 and 18', the former being permanently fixed while the latter is temporarily secured by suitable means. In the present instance, the arm 18 is secured to the plate 12 by a strap 19 which may be formed on or secured to the plate in any suitable manner as by means of a pair of rivets 20. The movable arm 18' may be held in its normal position by any other suitable means but herein I have provided a lug or tooth 21 forming an abutment which serves normally to lock the arm 18' in fixed position thereby to securely hold the generator in its place. Preferably the under side of the tooth 21 is beveled or inclined at 22, so that as the arm 18' is drawn toward its normal position it will ride down the incline and by its spring action will snap into its place behind the abrupt shoulder at the end of the incline. (See Fig. 3).

The groove 14 may be placed in any suitable relation to the plate 12 but herein is located at a substantial distance below the plate. In this case, the main or principal portion of the collar is offset or dropped a substantial distance below the plate. In the present instance, the collar not only serves to secure the generator in its place but sustains it as well. I much prefer the construction described because it is simple, inexpensive, easy to manipulate and yet locks the generator in its place in a most positive and secure manner. To remove the generator from its support, one has only to release the arm 18' which will then spring apart from the arm 18, and the generator may then be withdrawn in an upward direction. It will be noted that the arm 18' is longer than the arm 18 and extends beyond the plate to afford a finger hold.

While I have herein shown and described in considerable detail one specific form of my invention in order that it might be readily understood, it is obvious that the invention is not limited to the exact details described but that extensive deviations from the illustrated form might be made without departing from the principles thereof.

Having thus described my invention, what I claim and desire by Letters Patent to procure is:—

A support for a given body which presents a shoulder comprising a plate having an aperture through which the body fits, said plate holding the body against lateral movement, and a spring clip comprising relatively movable arms adapted to embrace said body beneath the shoulder at a point remote from said plate and hold it suspended in said aperture, said clip being connected to said plate at either side of the aperture.

In testimony whereof, I have signed my name to this specification, in the presence of two subscribing witnesses.

ELLSWORTH A. HAWTHORNE.

Witnesses:
E. HORACE HAWTHORNE,
VERONICA L. KELLEY.